June 27, 1944.  A. W. SCARRATT ET AL  2,352,291

COTTON HARVESTER

Filed May 29, 1941  3 Sheets-Sheet 1

Inventors
Albert W. Scarratt
David B. Baker
Clarence R. Hagen
By Paul O. Pippel
Atty.

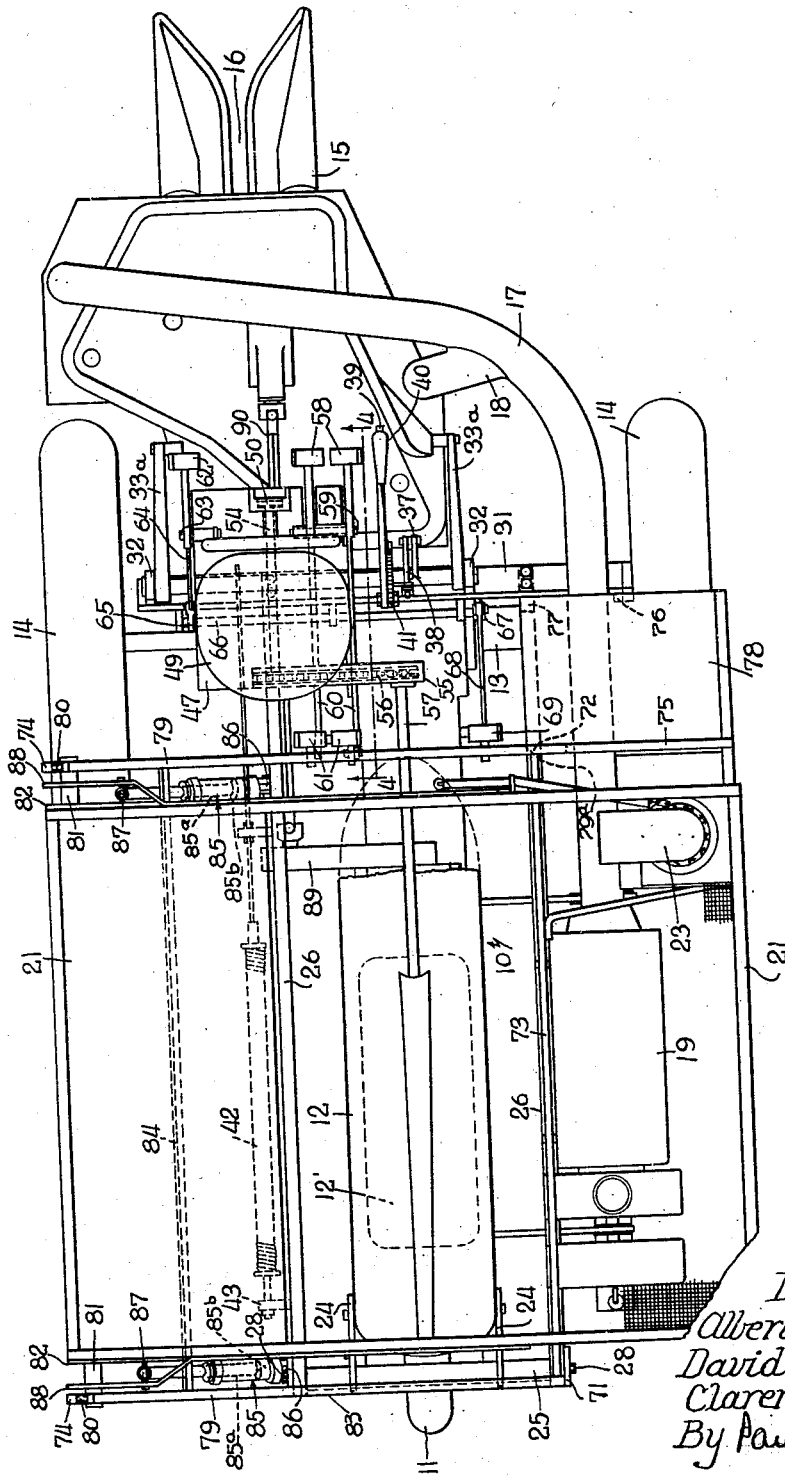

June 27, 1944.   A. W. SCARRATT ET AL   2,352,291
COTTON HARVESTER
Filed May 29, 1941   3 Sheets-Sheet 3

Inventors
Albert W. Scarratt
David B. Baker
Clarence R. Hagen
By Paul O. Pippel
Atty.

Patented June 27, 1944

2,352,291

UNITED STATES PATENT OFFICE 2,352,291

COTTON HARVESTER

Albert W. Scarratt, Kenilworth, David B. Baker, Riverside, and Clarence R. Hagen, Chicago, Ill., assignors to International Harvester Company, a corporation of New Jersey Application May 29, 1941, Serial No. 395,814

21 Claims. (Cl. 56—14)

This invention relates to a vehicle-mounted unit, particularly of the agricultural type such as a harvester or the like. More specifically the invention relates to a tractor-mounted cotton harvester.

The mounting of a harvester such as a cotton picker on a tractor presents a number of problems, most of which are due to the inherent nature of a cotton picker. A cotton picker of the usual type normally has a narrow throat for the reception of plants, and it is very important to guide the picker so that the throat is exactly on the line of plants. Accordingly, it is necessary that the tractor operator, in the case of a tractor-mounted cotton picker, be able to see into the throat from his station on the tractor. Consequently, it has been determined to mount the cotton picker at the rear of a tractor and to propel the tractor rearwardly so that the tractor operator is positioned almost above the throat of the cotton picker so as to be enabled to guide the picker accurately with respect to the cotton plants. The easy attachment and detachment of a cotton picker to and from a tractor is also very desirable, since the tractor must have other uses than that of carrying a cotton picker. Applicant has, accordingly, devised a means for easy attachment and detachment of a cotton picker.

According to the present invention, a cotton picker is carried by and to the rear of the driving axle of a tractor which has an operator's station and controls so arranged that the operator may face rearwardly for driving the tractor rearwardly for picking cotton. The cotton picker is supported on a framework secured to the tractor which framework also carries a cotton receptacle swingable to a dumping position. The framework also carries the operator's station and controls by which the tractor is driven rearwardly. The arrangement is such that first the picker is detached from the framework, and then the framework is removed from the tractor, the operator's station and controls and the cotton receptacle remaining connected to the framework.

The invention seeks, therefore, as its principal object, to provide an improved vehicle-mounted or -connected unit, particularly of the agricultural type, such as a harvester or the like.

An important object of the invention is to provide such construction in the form of a combined vehicle or tractor and harvester which is adapted to be operated normally rearwardly, or in a direction the reverse of conventional operation; and, more specifically, it is an object of the invention to utilize for these purposes and objects a conventional tractor of the tricycle type, which may be converted according to the present preferred embodiment of the invention.

Another object of the invention consists in the provision of an operator's control station including control mechanism having operative connections to the orignal control mechanism of the tractor, so that the operator may control the tractor in a manner as nearly as possible similar to normal operation.

The invention seeks as an important object to associate the control station and the harvester in a manner providing for accurate and efficient operation of the unit, specifically by facing the operator's seat rearwardly and positioning it with respect to the harvester so as to enable the operator to observe the operation of vital parts of the harvesting mechanism.

Still another object is to provide an attachment unit, such as a harvester, which may be readily mounted on and demounted from the vehicle or tractor; more specifically, the invention seeks to accomplish this by the provision of a U-shaped frame which embraces the tractor body and which is removably supported thereon so that, upon removal of simple attaching connections, the tractor may be driven away from the harvester or like unit and used elsewhere.

Another object is to construct the attachment unit, such as the harvester, so that it provides a compact unit having its parts generally within the dimensions of the vehicle or tractor.

Still another object is the provision of an auxiliary or attachment structure comprising a unitary frame adapted to support such unit as a harvester and the parts thereof and which is adapted for mounting on a tractor of any well known type.

Yet another object is to mount the harvester unit mainly on the supporting frame and independently of the tractor body.

And yet another object is to mount the harvester and its component parts on the tractor in such a manner as to provide a balanced unit capable of flexibility and efficiency in operation.

And still another object is to operate the unit with the vehicle running normally rearwardly, this arrangement taking full advantage of torque reaction as applied downwardly on the front end of the tractor.

Other objects and features of the invention will become apparent to those versed in the art as the disclosure of a preferred embodiment of the invention is more fully made.

In the drawings:

Figure 2 is a plan view of the picker shown in Figure 1;

Figure 1:
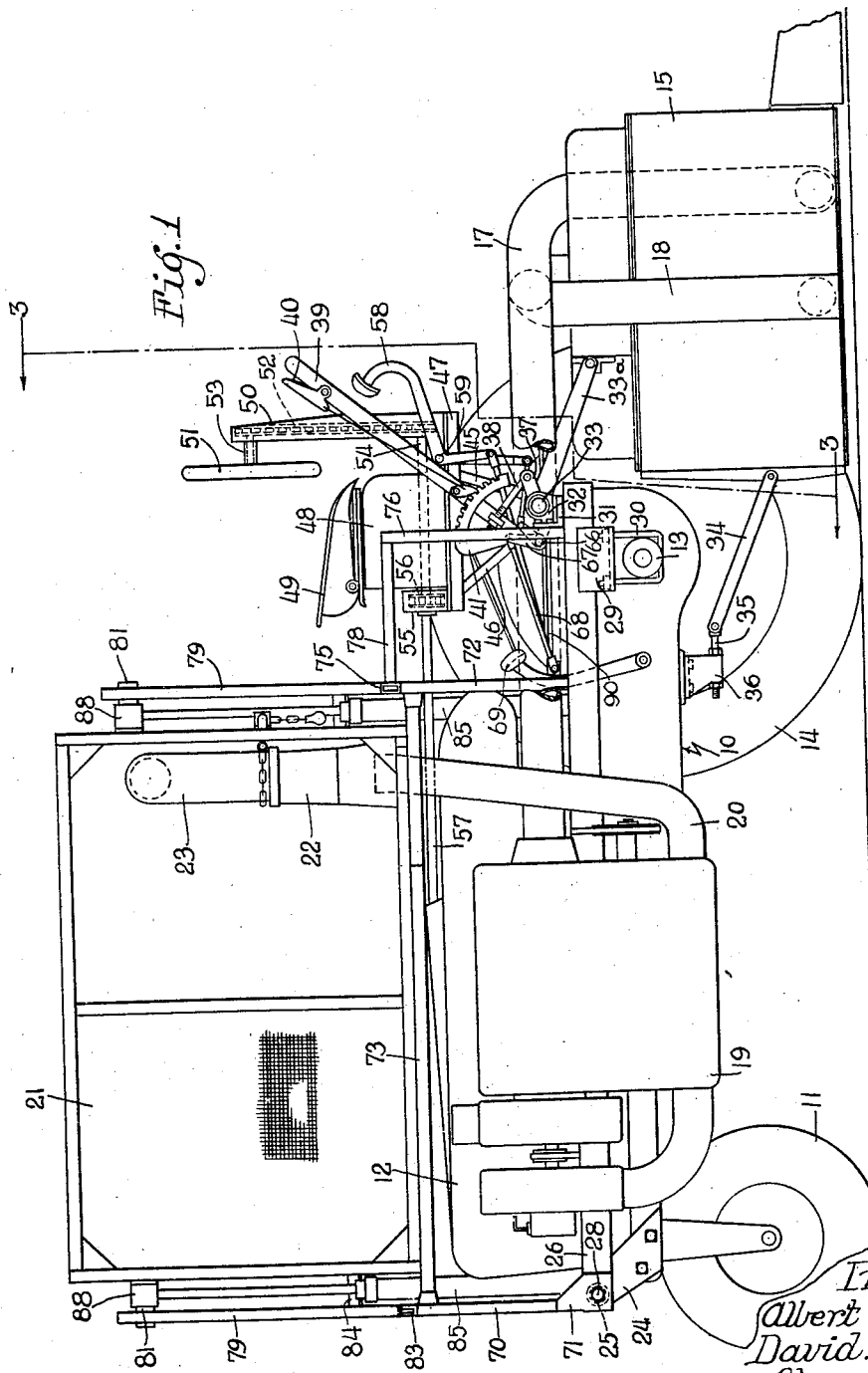
Figure 1 is a side view showing the cotton picker of the present invention mounted on a tractor.

The reference character 10 designates a tractor, which is preferably of the tricycle type, having a narrow front truck including a wheel 11, a narrow longitudinally extending body 12 including the usual power plant, as indicated at 12'; a rear axle 13; and rear wheels 14 at the ends of the rear axle.

An agricultural unit, here in the form of cotton-picking mechanism 15, is positioned to the rear of the rear axle 13 and includes harvesting means in the form of a narrow throat 16 for receiving cotton plants to be picked. Conveying means in the form of ducts 17 and 18 extend from opposite sides of the picking mechanism 15, the duct 18 emptying into the duct 17, the latter extending to a fan device 19 which provides suction for drawing cotton through the ducts 17 and 18 and pressure for forcing the cotton out through a duct 20, up through the bottom of, and into a cotton receptacle 21. The fan device is fully shown and claimed in applicant's copending application, Serial No. 262,751, filed March 18, 1939, on which Patent No. 2,247,682 issued on July 1, 1941, and is not more fully shown in the present application, since it forms no part of the present invention. The duct 20 is connected with a duct 22 secured to the base of the receptacle 21 and extending therewithin so as to discharge cotton thereinto with the aid of an adjustable discharge spout 23. As fully shown in applicant's aforesaid copending application, the receptacle 21 is swingable from the receiving position illustrated in the drawings to a dumping position in which it extends upwardly from its pivot axis to discharge to one side of the tractor.

The auxiliary supporting structure, here the framework by which the cotton-picking mechanism 15 and the receptacle 21 are mounted upon the tractor, will now be described.

As seen in Figures 1 and 2, plate members 24 are secured at opposite sides of the front end of the tractor body 12 and extend upwardly and forwardly to support a transversely extending pipe 25 passing through the plate members. As seen in Figure 2, longitudinally extending frame members 26, preferably of box section (Figure 6), are positioned on opposite sides of the tractor body 12 and in spaced relation thereto and have their forward ends detachably secured to the transverse pipe 25, in the manner shown in Figure 5. As seen in this figure, a plug 27 is secured within the end of the pipe 25 as by welding and has a threaded bore which receives the end of a bolt 28 passing through the frame member 26. The rear end of each frame member 26 is supported on the rear axle 13 by means of a bracket 29 secured to the frame member 26. The bracket 29 rests on the rear axle 13 and is secured thereto by means of a U-bolt 30 embracing the axle 13.

An angle member 31 is secured to the rear ends of the longitudinal frame members 26 and extends transversely of the tractor. Bearing brackets 32 are secured in spaced relation to the inside of the angle member 31 to provide a bearing support for a transverse rock-shaft 33 to which are secured parallel arms 33a which extend rearwardly and carry the cotton-picking and harvesting mechanism 15. A link 34 parallel to the arms 33a connects the cotton-picking mechanism and a bolt 35 adjustably secured to a bracket 36 secured to the underside of the tractor body 12. An arm 37 is secured to the rock-shaft 33 and is connected by a link 38 to an operating lever 39. Adjustment of the cotton-picking mechanism 15 is effected by adjustment of the lever 39, which may be secured in a number of different positions by means of detent mechanism 40 cooperating with an arcuate member 41 provided with teeth. Counterbalancing of the cotton-picking mechanism is effected by means of a spring device 42 secured at one end to the tractor body as at 43 and at the other end to the rock-shaft 33 as at 44.

Figures 3, 4, 5, 6:
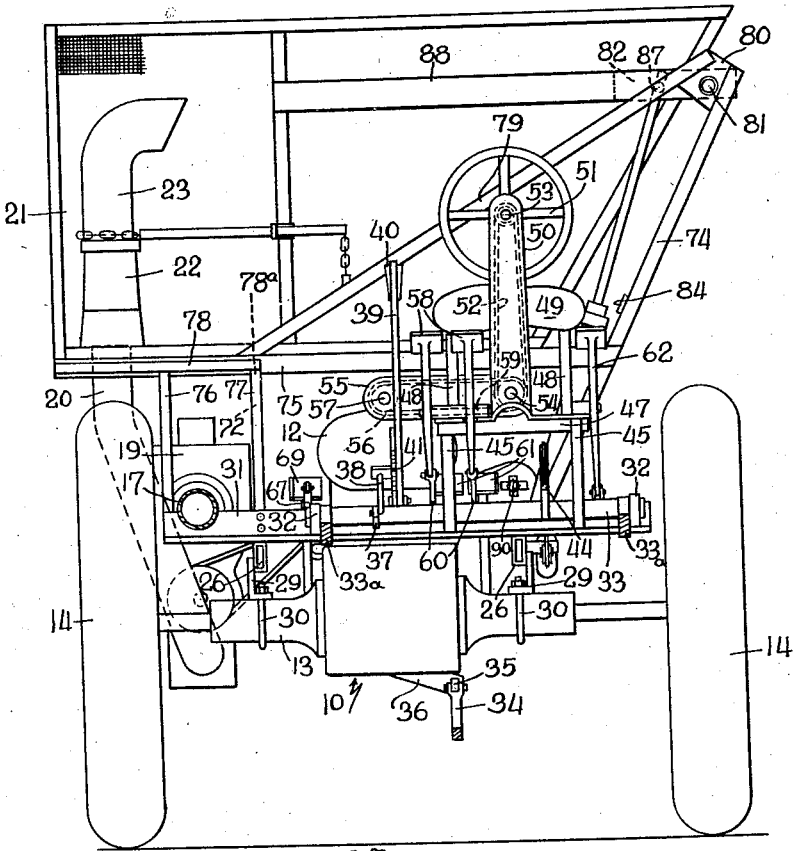
Figure 3 is a rear view, partly in section, taken along the line 3—3 of Figure 1.
Figure 4 is a detail view in section taken along the line 4—4 of Figure 2, showing parts of the tractor controls.
Figure 5 is a detailed plan view, partially in section, showing details of the framework for carrying the cotton harvester on the tractor.
Figure 6 is a detail view, partially in section, showing the manner in which certain parts of the framework are secured to one another.

The angle member 31 also supports an operator's seat and control pedals for driving the tractor rearwardly. As seen in Figure 4, a pair of brace members 45 and 46 are secured to the angle member 31 and to the under side of one end of a platform 47 which they support. As seen in Figure 3, the other end of the platform 47 is supported by a similar pair of brace members, in this figure only the brace member 45 of the additional pair being shown. Vertical members 48 extend upwardly from the platform 47 and support an operator's seat 49. At one end of the platform 47 is positioned a vertical housing 50 of box section which supports at its upper end a steering wheel 51 positioned to the rear of the seat 49. The housing 50 encloses a chain 52 which transmits turning of the wheel 51 from a shaft 53 to which the steering wheel 51 is secured to a stub shaft 54 supported at one end in the bottom of the hollow member 50. The other end of the shaft 54 is supported in one end of a transverse housing 55 which houses a chain 56 transmitting drive from the shaft 54 to a shaft 57 which is connected by means, not shown, to the front truck 11, through turning of which turning of the tractor is effected. The shaft 57 may be the original steering shaft for the steering mechanism of a tractor of any of a number of well known types.

The platform 47 supports a pair of brake pedals 58 by means of a pivot member or rock-shaft 59 carried on the platform 47. The lower ends of the pedals 58 are connected by links 60 to brake pedals 61 which are to be used when the tractor is to be driven with the operator facing forwardly. In short, the pedals 61 are parts of the original brake control mechanism of the tractor. A clutch pedal 62 is mounted on a pivot member or rock-shaft 63 supported on the platform 47. The lower end of the pedal 62 is connected by a link 64 to an arm 65 secured to one end of a rock-shaft 66 having secured to the other end an arm 67 connected by a link 68 to a clutch pedal 69 which is used when the tractor is driven with the operator facing forwardly.

As seen in Figure 1, an upright member 70 secured by a plate 71 to the front end of the longitudinal member 26 at the left side of the tractor body 12 extends upwardly from the longitudinal member 26. Similarly, an upright member 72, Figure 1, extends upwardly from a point on the same longitudinal member 26 somewhat in front of the rear axle 13. A longitudinal member 73 joins the upper ends of the upright members 70 and 72. As seen in Figures 3 and 6, a pair of members 74, only the rear one of which is shown, extends upwardly and outwardly from the longitudinal member 26 at the right side of the tractor body from points in the length of the right member 26 corresponding to points in the length of the left hand member 26 from which the upright members 70 and 72 extend. The rear member 74, Figure 3, at one side is connected to the rear member 72, Figure 1, at the other side by means of a horizontal transverse member 75, Figure 3. This member 75 has a portion outward of the upright member 72, which portion along with uprights 76 and 77 secured to the transverse angle member 31 supports a platform 78 for an operator. A diagonal member 79, Figures 1, 2 and 3, extends from approximately the connection 79ª, Figures 2 and 3, of the transverse horizontal member 75 and the upright member 72 to a connection with a plate 80, Figure 3, which is also connected to the upper end of the rear member 74. The plate 80 forms a bearing support for one end of a pivot member 81, Figures 1, 2 and 3, extending the length of the cotton receptacle 21 and said member being secured to the receptacle by members 82 at the ends of the receptacle. Similarly, the other end of the pivot member 81 is supported in a plate secured to the forward member 74 and to a diagonally extending member 79 at the front of the tractor. The lower end of this diagonally extending member is secured to one end of a horizontal member 83 which is like the horizontal member 75 except that it does not extend outwardly beyond the left hand longitudinal member 26. The horizontal member 83 is secured at one end to the front member 74, Figure 2, and at the other end to the upper end of the upright member 70, Figure 1. A longitudinal member 84 extends as a brace between the members 74 at the level of the horizontal members 73, 75, and 78.

The pivot member 81 serves as a pivot axis for the cotton receptacle 21 in its movement from the receiving position to the dumping position, not shown. This movement is accomplished by fluid-power devices 85 positioned at the ends of the receptacle 21. The power-lift devices are not shown in detail since they form no part of the present invention. They comprise essentially a cylinder 85ª and a piston 85ᵇ moving within the cylinder under the action of fluid under pressure supplied by the tractor. As seen in Figure 2, one end of each fluid-power device 85 is connected to the tractor at 86, and the other end is connected to the cotton receptacle 21 through pins 87 extending between members 82 and members 88 secured to the members 82 and extending in spaced relation thereto.

The cotton-picking mechanism 15 is not shown nor described in detail since, per se, it forms no part of the present invention. The drive of the cotton-picking mechanism comes from the tractor body through a laterally extending drive casing 89 and a longitudinally extending power take-off shaft 90. It is sufficient to state that the cotton-picking mechanism operates upon the cotton bearing plants to pick the cotton therefrom as these plants are received by the narrow throat 16. In operation the tractor is propelled rearwardly with the operator seated on the seat 49 and facing rearwardly. It will be observed from Figures 1 and 2 that the operator will be in line with the narrow throat 16 and, to a great extent, over the throat. Thus he is able to guide the tractor so that the narrow throat 16 properly engages the cotton plants to be picked. Another advantage to the arrangement of a rearwardly propelled tractor and a cotton picker mounted at the rear of the tractor is that the torque reaction set up by rearward movement of the tractor is such as to act downwardly on the front truck of the tractor and so to counteract the tendency of the truck to be raised due to the positioning of the cotton picker at the rear. The opposite takes place if the tractor is propelled forwardly. The forward movement tends to raise the front end of the tractor, and the harvester positioned at the rear of the tractor has the same tendency.

As the tractor and the cotton-picking mechanism are propelled through a field of cotton, cotton is picked by the mechanism 15 and is caused by the fan device 19 to be drawn through the ducts 17 and 18 and forced through the ducts 20 and 22 into the receptacle 21. When the receptacle becomes full, it is lifted so as to dump.

When the cotton-picking mechanism and the receptacle are to be removed from the tractor, the following procedure is followed. Supports are placed under the picking mechanism so that the weight thereof is no longer carried by the tractor. Then the arms 33a and 34 and the counter-balancing spring device 42 are disconnected from the picking mechanism, and the tractor is moved away. Next the fan device 19 and the ducts 17, 18, and 20 are removed. Then the steering shaft 57 is disconnected from the housing 55 and the drive chain 56; the links 60 are disconnected from the brake pedals 61; and the link 68 is disconnected from the clutch pedal 69. When the U-bolts 13 connecting the brackets 29 to the rear axle 13 are removed, supports are placed under longitudinal side members 26 to the rear of the rear axle 13 and also near the front ends of the members 26. Then the front ends of the side members 26 and the plates 71 are disconnected from the ends of the transverse pipe 25 by unscrewing of the bolts 28 from the plugs 27 (see Figure 5). Then the tractor is moved forwardly, away from the framework which rests on the supports. When the rear axle 13 reaches the supports near the front ends of the longitudinal members 26, other supports are placed under the front ends of the longitudinal members immediately behind the rear axle 13, and the supports to the front are removed. Then the axle may clear the longitudinal member 26, the framework, the cotton receptacle 21, and the operator's station, which remains on the supports, and the tractor is free for other uses.

It will be apparent from the foregoing description that a new and novel cotton harvester construction has been provided. The harvester is mounted at the rear of a tractor which is to be driven rearwardly by an operator facing to the rear. Thus the operator may be well over the throat of the picking mechanism and may guide the picking mechanism more easily with respect to the plants to be picked. Since the tractor is propelled rearwardly, the resultant downward pull on the front truck due to torque reaction tends to counteract the tendency of the front truck to be lifted due to the weight of the picking mechanism at the rear of the tractor. The cotton harvester including picking mechanism and cotton receptacle are mounted on a framework carried on the tractor in such a manner that the picking mechanism may be removed from the framework, and may be driven away from the framework upon which are left the receptacle and the operator's control elements by which he drives the tractor while facing to the rear. The framework includes, in effect, two horizontally disposed rectangular frames one above the other. A lower rectangular frame is composed of the longitudinal members 26, the cross pipe 25, and the angle member 31. An upper rectangular frame is composed of longitudinal members 73 and 84 and transverse members 75 and 83.

The intention is to limit the invention only within the scope of the appended claims.

What is claimed is:

1. In combination, a tractor having a narrow body and a driving axle at the rear of the body, cotton-picking mechanism positioned to the rear of the axle, a receptacle for cotton positioned over the tractor, and means for mounting the cotton-picking mechanism and the receptacle on the tractor, said means comprising a rectangular framework surrounding the tractor body and secured to the tractor, means connecting the cotton-picking mechanism to the side of the framework at the rear of the tractor, and means extending upwardly from the framework and supporting the receptacle for pivotal movement.

2. In combination, a tractor having a narrow body and an axle at the rear thereof, cotton-picking mechanism positioned at the rear of the body, a receptacle for cotton positioned over the body, and means for detachably supporting the receptacle and the cotton-picking mechanism on the tractor, said means comprising a first transverse member secured to the tractor across the front of the body, longitudinal members detachably connected to the first transverse member at one end and to the tractor axle at the other end and extending along opposite sides of the body, a second transverse member secured to the ends of the longitudinal members and extending across the rear of the body, means detachably connecting the cotton-picking mechanism to the second transverse member, means secured to the second transverse member and to the longitudinal members and extending upwardly therefrom to form a support for the receptacle, whereby, upon detachment of the cotton-picking mechanism from the second transverse member at the rear of the tractor and detachment of the longitudinal members from the tractor axle and from the first transverse member at the front of the tractor, the tractor may be moved away free from the cotton-picking mechanism and from the longitudinal members, the second transverse member, and the receptacle.

3. In combination, a tractor having a narrow body and an axle at the rear thereof, cotton-picking mechanism positioned at the rear of the body, a receptacle for cotton positioned over the body, means for running the tractor backwards comprising an operator's seat, a steering wheel, and rearwardly movable control pedals, and means for detachably supporting the receptacle, the means for running the tractor backwards, and the cotton-picking mechanism on the tractor, said means comprising a first transverse member secured to the tractor across the front of the body, longitudinal members detachably connected to the first transverse member at one end and to the tractor axle at the other end and extending along opposite sides of the body, a second transverse member secured to the ends of the longitudinal members and extending across the rear of the body, means detachably connecting the cotton-picking mechanism to the second transverse member, means securing to the second transverse member the means for running the tractor backwards, means secured to the second transverse member and to the longitudinal members and extending upwardly therefrom to form a support for the receptacle, whereby, upon detachment of the cotton-picking mechanism from the second transverse member at the rear of the tractor and detachment of the longitudinal members from the tractor axle and from the first transverse member at the front of the tractor, the tractor may be moved away free from the cotton-picking mechanism and from the longitudinal members, the second transverse member, and the means for driving the tractor backwards.

4. In combination, a tractor having a narrow body and an axle at the rear thereof, cotton-picking mechanism positioned at the rear of the tractor, a receptacle for cotton positioned over the tractor, and means for supporting the cotton-picking mechanism and the receptacle on the tractor, said means comprising a pair of horizontal rectangular frames positioned one over the other and surrounding the tractor body and vertical members securing the frames to one another, the side of the lower rectangular frame extending across the front of the tractor being detachably connected to the adjacent sides of the lower frame, means securing the said side to the front of the tractor, means detachably connecting to the axle the sides of the lower frame extending longitudinally of the tractor, means detachably connecting the cotton-picking mechanism to said last-mentioned side, and means connecting the receptacle to the vertical members for pivotal support, whereby, upon detachment of the cotton-picking mechanism from the rear side of the lower rectangular frame and detachment of said longitudinally extending sides of the lower frame from the tractor axle and from the front side of the lower rectangular framework, the tractor and the said front side may be moved away from the cotton-picking mechanism and from the rectangular framework and the receptacle.

5. In combination, a tractor of the tricycle type having a narrow body, a truck beneath the front end of the body, an axle extending from both sides of the rear of the body, and wheels at the ends of the axle spaced from the body, a supporting framework positioned on the tractor and comprising a first transverse member secured to the front of the tractor body and extending beyond the sides thereof, longitudinal members extending parallel to the body in spaced relation thereto and at opposite sides thereof and secured at one end to the ends of the first transverse member and at the other end to the tractor axle, a second transverse member secured to the said other ends of the longitudinal members at the rear of the tractor, cotton-picking mechanism positioned at the rear of the tractor, means supporting the cotton-picking mechanism on the second transverse member, means rearwardly supported by the second transverse member for driving the tractor rearwardly and including a steering wheel, brake, and clutch pedals, and an operator's seat, members secured to and extending upwardly from the transverse and longitudinal members, and a receptacle for cotton positioned over the tractor body and connected to the last-mentioned members for swinging movement with respect to the tractor about an axis parallel to and to one side of the tractor center line.

6. A vehicle-mounted agricultural unit comprising, in combination, a vehicle having a longitudinal body, a U-shaped supporting frame arranged with respect to the body with its opposite legs respectively paralleling opposite sides of the body and the closed portion of the U across one end of the body, an agricultural unit carried by said portion, means removably connecting the free ends of the U to the other end of the body, an operator's station for the control of the agricultural unit carried on said closed portion of the U-frame, and means carried by another one of the legs of the U-frame for handling material from the agricultural unit.

7. A vehicle-mounted harvester comprising, in combination, a vehicle having a longitudinal body, a U-shaped supporting frame arranged with respect to the body with its opposite legs respectively paralleling opposite sides of the body and the closed portion of the U across one end of the body, harvesting means carried by said portion, means supporting the frame on the body, an operator's control station for the harvesting means mounted on the closed portion of the U, and means carried by another one of the legs of the U-frame for handling material from the harvesting means.

8. A vehicle-mounted agricultural unit comprising, in combination, a tractor having a longitudinal body, a U-shaped supporting frame arranged with respect to the body with its opposite legs respectively paralleling opposite sides of the body and the closed portion of the U across one end of the body, an agricultural unit carried by said portion, means removably connecting the free end of the U to the other end of the body, and an operator's station carried on said closed portion of the U and including control means for the vehicle.

9. A vehicle-mounted agricultural unit comprising, in combination, a tractor having a longitudinal body including a rear ground support and a steerable front ground support, a U-shaped frame arranged with respect to the body with its closed portion adjacent one end of the body and its legs extending respectively adjacent opposite sides of the body and toward the other end of the body, means connecting the legs of the frame to the body, an agricultural unit, means connecting the closed end of the frame to the body and including a support for the agricultural unit, and an operator's station on the frame at the closed end thereof and including control means for the vehicle front ground support.

10. A vehicle-mounted harvester comprising, in combination, a vehicle having a longitudinal body, a U-shaped supporting frame arranged with respect to the body with its opposite legs respectively paralleling opposite sides of the body and the closed portion of the U across one end of the body, harvesting means at one end of the frame and including a harvesting element generally in longitudinal alinement with one of the legs of the U-frame, and an operator's station carried by the frame generally above said leg of the U and providing a vantage point from which an operator may observe the aforesaid harvesting element.

11. A vehicle-mounted agricultural unit comprising, in combination, a vehicle adapted to be operated normally rearwardly and having a longitudinal body including a power plant at the forward end thereof, a control element for the power plant disposed forwardly of the rear end of the body and movable with respect thereto, an agricultural unit at the rear of the tractor and including an agricultural element operable upon rearward movement of the tractor, means supporting said unit at the rear of the body and including a member secured to the body rearwardly of the aforesaid control element, an operator's station at the rear of the body and having an operator's seat facing the agricultural element, and control mechanism adjacent said seat and including a connection to the aforesaid control element and having a part carried by the aforesaid member.

12. For a vehicle-mounted harvester including a vehicle having a longitudinal body, a front steerable ground support including steering mechanism at the front of the body, a rear ground support and a harvester unit at the rear of the body: control means for the steerable front ground support comprising a platform supported at the rear of the body and including an operator's seat, a steering member carried on the platform, a shaft running longitudinally of the body and connected at one end to the steering mechanism and journaled at its other end on the platform, a stub shaft journaled on the platform, means connecting the stub shaft with the first shaft, and means connecting the steering member and the stub shaft.

13. In an implement mountable upon a tractor having laterally-spaced traction wheels at the ends of a rear axle housing, and an engine unit above and projecting forwardly of said axle housing; the combination of a U-shaped frame disposed in a horizontal plane with its closed end portion disposed rearwardly and with its leg portions projecting forwardly, material-treating parts depending from a rearward portion of the frame to a position below said axle housing when the frame is at an elevation exceeding that of said axle housing and facing rearwardly for operation during rearward movement of the implement, said legs of the U-shaped frame being spaced apart sufficiently to receive and pass along opposite sides of the engine unit while the frame is at said elevation exceeding that of the axle housing pursuant to backing of the tractor into the frame preparatory to mounting the implement on the tractor, said depending material-treating parts being displaced from the space traversed by the tractor wheels while backing into the frame, means upon a front portion of the engine unit for connecting front portions of the frame legs and supporting the same in a desired spaced relation, and means for supporting the rear portion of said frame upon the axle housing.

14. In a harvester implement mountable upon a tractor having laterally-spaced traction wheels at the ends of a rear axle housing, and an engine unit above and projecting forwardly of said axle housing; the combination of a frame including side members disposable along opposite sides of the engine unit, basket support means on said side members, a crop-receiving basket on said support means in superposed relation with said side members, a crop harvesting unit depending from a rear portion of said frame to a position below the tractor axle housing, when said frame is at an elevation exceeding that of said axle housing, and facing rearwardly for operation during rearward movement of the implement, said side members being spaced apart sufficiently to receive and pass along opposite sides of the engine unit while the frame is at said elevation pursuant to backing the tractor into the frame preparatory to mounting the implement on the tractor, and said basket support means and said basket providing clearance above and between said side members to receive the engine unit of the tractor while it is so backed, means upon a front portion of the engine unit for bracing and supporting front portions of the frame side members, and means for supporting rear portions of the frame upon said axle housing.

15. In cotton picking apparatus for use upon a tractor which is designed for normal forward driving and which includes a fore and aft extending body, steerable support means forwardly on said body, laterally spaced traction supports rearwardly on said body, and steering and power control members disposed at a rearward portion of said body for manipulation by a forwardly facing operator for steering the steerable support means and controlling operation of the traction supports; the combination of a frame mountable on said body, a cotton picking unit depending from said frame for disposal rearwardly of said body when the frame is so mounted and including a rearwardly facing throat for receiving cotton plants to be picked when the tractor is driven backwardly, an operator's station on a portion of said frame disposable at a rear portion of the tractor body, steering and power control members on said frame for access to a rearwardly facing operator at said station, and means operably connecting said steering and power control members respectively with the steering and control members of the tractor.

16. In a cotton picking apparatus for operation in conjunction with a rearwardly drivable tractor which has front steering support means, rear traction support means, a power plant between said support means, and a rearwardly extending steering control means: the combination of a cotton picking unit operable from the tractor power plant and having a cotton plant receiving throat; means for supporting said unit from and rearwardly of the tractor with said throat in a rearwardly facing direction to receive the plants when the tractor is driven rearwardly; and a control station for said apparatus and for the tractor, said control station including a rearwardly facing operator's seat displaceable over a rear portion of the tractor for placing an operator thereon within view of plants in the immediate course of said throat, a manually operable steering control member rearwardly of said seat accessibly to the seated operator, and means for operatively connecting said steering control member with the steering control means.

17. The combination set forth in claim 16, wherein there is a cotton receptacle, means for mounting said receptacle over the tractor power plant, and means for conveying picked cotton from said unit into the receptacle.

18. In a control station for an agricultural implement which includes a motor-driven vehicle drivable rearwardly for operating a rearwardly facing harvesting unit thereon, and a throttle controlling means operable to control the power output of the vehicle motor; the combination of an operator's platform mountable upon a rear portion of said vehicle, a rearwardly facing operator's seat upon said platform, a rock-shaft on said platform, a throttle control member accessible to an operator in said seat and connected with said rock-shaft for rocking the same, and means for connecting said rock-shaft with said throttle controlling means to operate the same co-ordinately with the rocking of said rock-shaft.

19. In a control station for an agricultural implement which includes a motor-driven vehicle drivable rearwardly for operating a rearwardly facing harvesting unit depending at the rear end thereof; the combination of an operator's platform mountable upon a rear portion of the vehicle, a rearwardly facing operator's seat on said platform, a rock-shaft carried transversely on said platform, arm means on and projecting rearwardly from said rock-shaft for supporting said harvesting unit rearwardly of and within view of an operator in said seat, and lever means connected with said rock-shaft for rocking the same to adjust the height of said harvesting unit and disposed accessibly to an operator in said seat.

20. In cotton picking apparatus for operation in conjunction with a rearwardly drivable tractor which has front steering support means, rear traction support means, a power plant between said support means, and controls respectively for the support means and for said power plant: the combination of a cotton picking unit operable from the tractor power plant and having a cotton plant receiving throat; means for supporting said unit from and rearwardly of the tractor with said throat in a rearwardly facing direction to receive plants when the tractor is driven rearwardly, said picking unit supporting means being operable to control the height of the picking unit; a control station for said apparatus and for the tractor, said control station including a rearwardly facing operator's seat disposable over a rear portion of the tractor for placing an operator thereon within view of field plants in the immediate course of said throat, a manually operable steerable control member rearwardly of said seat accessibly to the seated operator and additional manually operable control members accessible to the seated operator; means for connecting the steering control member with the steering support control; and means respectively operatively connecting said additional manually operable members with the power plant control, with the traction support control, and with the picking unit supporting means.

21. For a tractor having a narrow longitudinal body carried at its front end on a steerable front truck and at its rear on a transverse rear axle structure including a pair of widely spaced wheels, said tractor having steering mechanism for the front truck, clutch control mechanism and brake control mechanism; the combination of a harvester unit adapted for connection to such tractor rearwardly of the rear axle structure in a rearwardly facing direction to cooperate with the tractor in forming a self-propelled harvester implement operated with the tractor normally running rearwardly, means for mounting said harvester unit upon said rear axle housing, and an operator's control station structure detachably mountable over the rear axle and including an operator's seat facing rearwardly toward the harvesting unit when the structure is so mounted, a steering member, a clutch control member and a brake control member rearwardly of said seat and accessible to an operator on said seat, and means for connecting the last three named members to the tractor steering mechanism, the tractor clutch control mechanism, and the tractor brake control mechanism, respectively.

ALBERT W. SCARRATT.
DAVID B. BAKER.
CLARENCE R. HAGEN.